(12) United States Patent
Liu et al.

(10) Patent No.: US 6,771,345 B2
(45) Date of Patent: Aug. 3, 2004

(54) PIXEL ELECTRODE STRUCTURE FOR A LIQUID CRYSTAL DISPLAY WITH A HIGH APERTURE RATIO

(75) Inventors: Hsiang-Lung Liu, Taoyuan Hsien (TW); Hsu-Ho Wu, Hsinchu (TW)

(73) Assignee: Hannstar Display Corp., Taipei (TW)

( * ) Notice: Subject to any disclaimer, the term of this patent is extended or adjusted under 35 U.S.C. 154(b) by 2 days.

(21) Appl. No.: 10/351,792

(22) Filed: Jan. 27, 2003

(65) Prior Publication Data

US 2003/0227591 A1 Dec. 11, 2003

(30) Foreign Application Priority Data

Jun. 7, 2002 (TW) ........................ 91112394 A

(51) Int. Cl.⁷ ............................... G02F 1/1343
(52) U.S. Cl. ........................ 349/146; 349/139
(58) Field of Search ................ 349/139, 146, 349/96, 38

(56) References Cited

U.S. PATENT DOCUMENTS 5,745,207 A * 4/1998 Asada et al. ............... 349/141
6,411,357 B1 * 6/2002 Ting et al. ................. 349/141
6,522,379 B1 * 2/2003 Ishihara et al. ............ 349/139

* cited by examiner

Primary Examiner—Toan Ton
(74) Attorney, Agent, or Firm—Thomas, Kayden, Horstemeyer & Risley

(57) ABSTRACT

A pixel electrode structure for a liquid crystal display with a high aperture ratio increases the aperture ratio and eliminates Mura phenomenon. Any two adjacent pixel electrodes are disconnected to each other. Each pixel electrode comprises a first-lengthwise periphery that overlaps a first-adjacent data line to form a first overlapping portion, and a second-lengthwise periphery that overlaps a second-adjacent data line to form a second overlapping portion. The first-lengthwise periphery and the second-lengthwise periphery have an identical triangle-wave profile and are symmetrical to each other. The triangle-wave profile is formed by connecting a plurality of right-angled and equilateral triangles.

8 Claims, 8 Drawing Sheets

PIXEL ELECTRODE STRUCTURE FOR A LIQUID CRYSTAL DISPLAY WITH A HIGH APERTURE RATIO

BACKGROUND OF THE INVENTION

1. Field of the Invention

The invention relates to a liquid crystal display (LCD) that has a high aperture ratio (HAR), and more particularly, to a pixel electrode structure for the LCD with HAR.

2. Description of the Related Art

As resolutions of liquid crystal display (LCD) increase, aperture ratio of the LCD becomes more and more insufficient. Recently, color filter on array (COA) technology, has been developed to provide a LCD of high aperture ratio. In the HAR process, the color filter process is integrated with the TFT array process on the same glass substrate, thus the aperture ratio of the TFT-LCD device is increased to effectively improve brightness of the panel, and the step of attachment/alignment between a color filter substrate and a TFT array substrate is omitted to improve yield and decrease process costs. Moreover, in the HAR process, an overlapping portion is formed between a transparent pixel electrode and a data line to decrease the required area of a black matrix (BM) layer, resulting in a higher aperture ratio in the TFT-LCD device.

FIG. 1 is a top view showing an electrode structure in a pixel of a conventional TFT-LCD device formed using a HAR process. FIG. 2 is a sectional diagram along line 1—1 of FIG. 1 showing the rotating orientations of liquid crystal molecules in the conventional TFT-LCD device using a HAR process.

The conventional TFT-LCD device comprises a plurality of traversing gate lines 12 and data lines 14 extending lengthwise to define a plurality of pixels 10 in a matrix, each pixel 10 comprising a pixel electrode 16 and a TFT. Using one data line 14 as the boundary, a first pixel 10A is covered by a first pixel electrode 16A, and a second pixel 10B is covered by a second pixel electrode 16B. Also, the periphery of the first pixel electrode 16A overlaps one side portion of the data line 14, the periphery of the second pixel electrode 16A overlaps another side portion of the data line 14, and a predetermined distance is kept to space the first pixel electrode 16A from the second pixel electrode 16B over the data line 14. Further, an arrow P indicates a light-polarization planar direction on a polarizer, a light-entry direction.

During a HAR process on a TFT array glass substrate 17, a first metal layer is patterned as the gate lines 12, and then an insulating layer 15 is deposited to cover the gate lines 12 and the glass substrate 17. Next, processes corresponding to TFT are performed on a predetermined area of the gate line 12, and a second metal layer is patterned as the data lines 14. Next, a transparent conductive layer is patterned as the first pixel electrode 16A and the second pixel electrode 16B.

In a case using TN-type (twisted nematic type) LCD, when an extra voltage exceeds a critical value, the liquid crystal molecules 18 originally parallel to the alignment film are rotated to become perpendicular to the alignment layer in accordance with the magnitude of the lengthwise electric field. However, a transverse electric field is generated between the periphery of the first pixel electrode 16A and the periphery of the second pixel electrode 16B, thus the inclined directions of the liquid crystal molecules 18I and 18 II near the periphery of the pixel electrodes 16A and 16B are influenced by the lengthwise and transverse electric field. Also, when an included angle between the arrow P (a light-polarization planar direction on a polarizer) and the long-axis direction of the liquid crystal molecule 18I is 45°, an ellipsoidal polarized light caused by birefringence effect may pass an analyzer perpendicular to the polarizer to result in light leakage. With regard to the rotating orientation of the liquid crystal molecules 18II over the sidewall of the data line 14, however, a Mura phenomenon occurs, manifesting as non-uniform color difference, to form a light leakage area L.

In another attempt to solve the above-described problems, the width of the data line 14 is increased to shield the light leakage area L, but this decreases the aperture ratio of the TFT-LCD device.

SUMMARY OF THE INVENTION

Accordingly, an object of the invention is to provide a pixel electrode structure in an LCD to increase the aperture ratio and eliminate Mura phenomenon near the overlapping portion between the pixel electrode and the data line.

To achieve these and other aims, the invention provides a pixel electrode structure of a liquid crystal display with a high aperture ratio. A first substrate and a second substrate are disposed parallel to each other, such that an internal space is formed between the interior surface of the first substrate and the interior surface of the second substrate. A liquid crystal layer is formed in the internal space. At least one polarizer is formed on the exterior surface of the first substrate or the exterior surface of the substrate. A plurality of parallel gate lines is transversely formed on the interior surface of the first substrate. A plurality of data lines parallel and extends lengthwise on the interior surface of the first substrate. A plurality of pixels is defined by the gate lines and the data lines in a matrix, in which each pixel comprises at least one TFT formed on the interior surface of the first substrate and near the intersection of the gate line and the data line, a common electrode on the interior surface of the second substrate, covering the pixel, and a pixel electrode on the interior surface of the first substrate, covering the pixel.

In one preferred embodiment, no two adjacent pixel electrodes are connected to each other. Each pixel electrode comprises a first-lengthwise periphery that overlaps a first-adjacent data line to form a first overlapping portion, and a second-lengthwise periphery that overlaps a second-adjacent data line to form a second overlapping portion. The first-lengthwise periphery and the second-lengthwise periphery have an identical triangle-wave profile and are symmetrical to each other. The triangle-wave profile is formed by connecting a plurality of right-angled and equilateral triangles.

In another preferred embodiment, no two adjacent pixel electrodes are connected to each other. Each pixel electrode comprises a first-lengthwise periphery that overlaps a first-adjacent data line to form a first overlapping portion, and a second-lengthwise periphery that overlaps a second-adjacent data line to form a second overlapping portion. The first-lengthwise periphery and the second-lengthwise periphery have an identical square-wave profile, and the square-wave profile is formed by connecting a square protrusion and a square indentation in sequence. The square protrusion of the first-lengthwise periphery corresponds in position to the square indentation of the second-lengthwise periphery, and the square indentation of the first-lengthwise periphery corresponds in position to the square protrusion of the second-lengthwise periphery.

DESCRIPTION OF THE DRAWINGS

For a better understanding of the present invention, reference is made to a detailed description to be read in conjunction with the accompanying drawings, in which.

DETAILED DESCRIPTION OF THE INVENTION

First Embodiment

Figure 1:
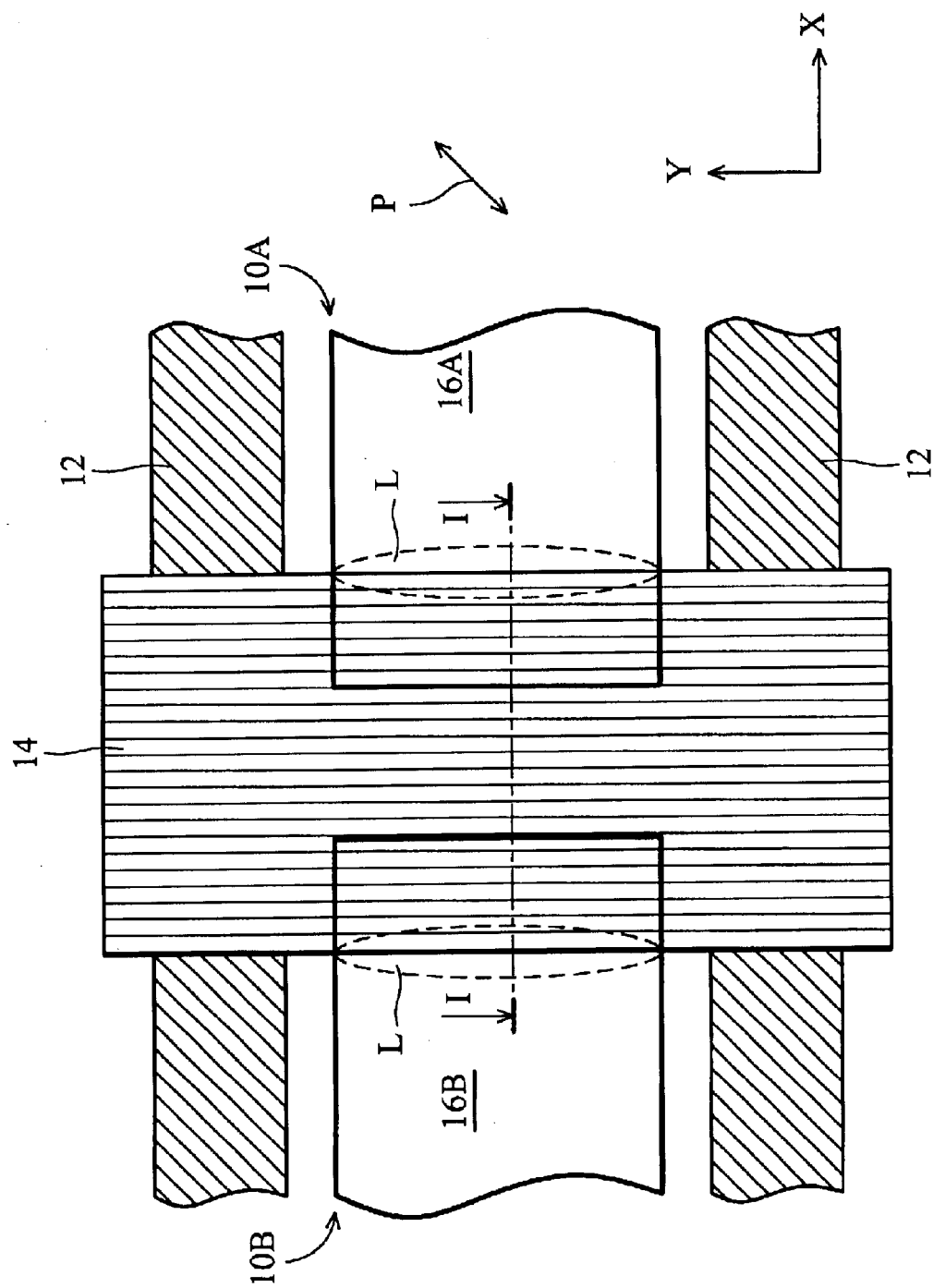
FIG. 1 is a top view showing an electrode structure in a pixel of a conventional TFT-LCD device with high aperture ratio.
Figure 2:
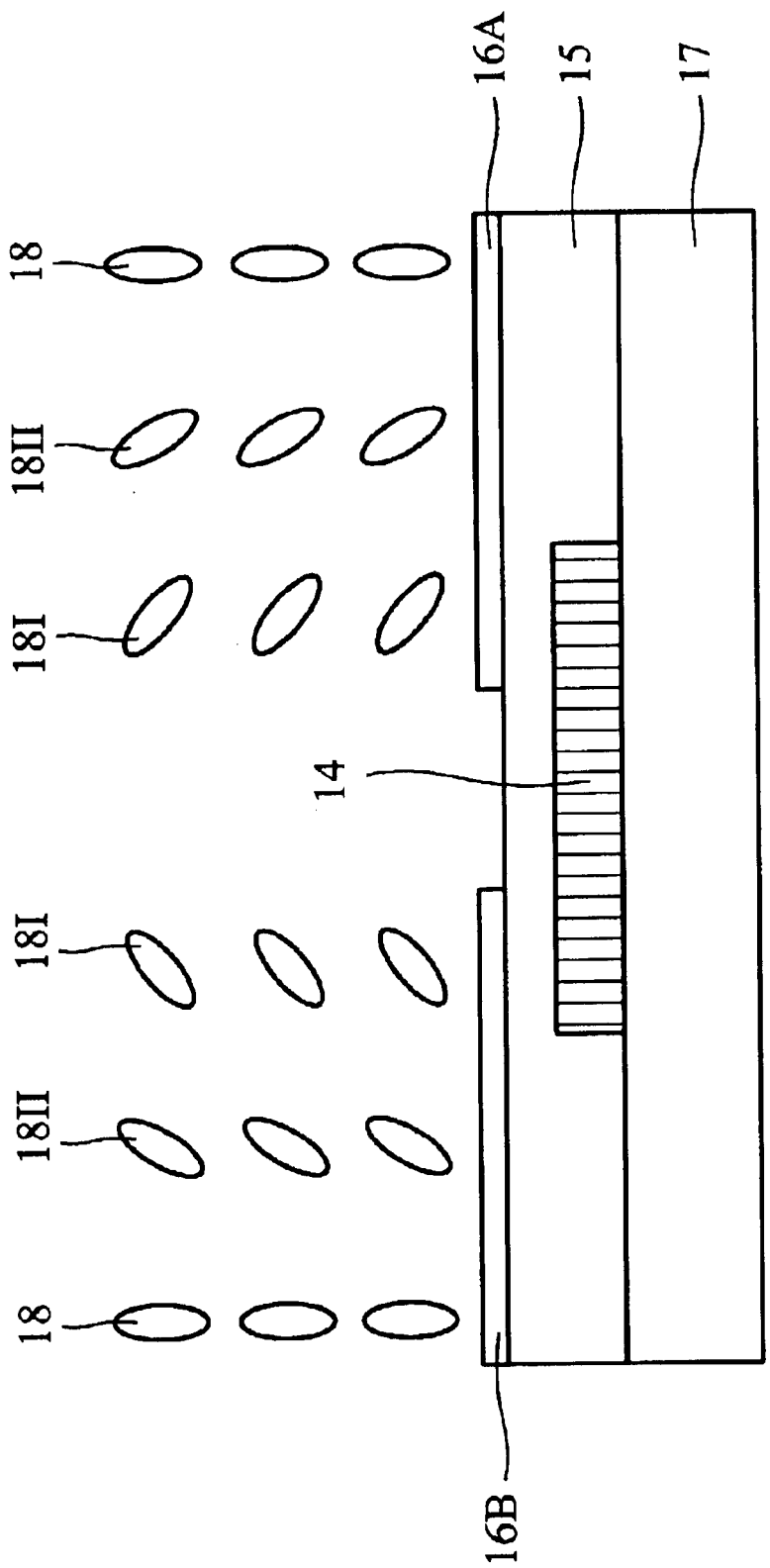
FIG. 2 is a sectional diagram along line 1—1 of FIG. 1 showing the rotating orientations of liquid crystal molecules in the conventional TFT-LCD device with high aperture ratio.
Figure 3A:
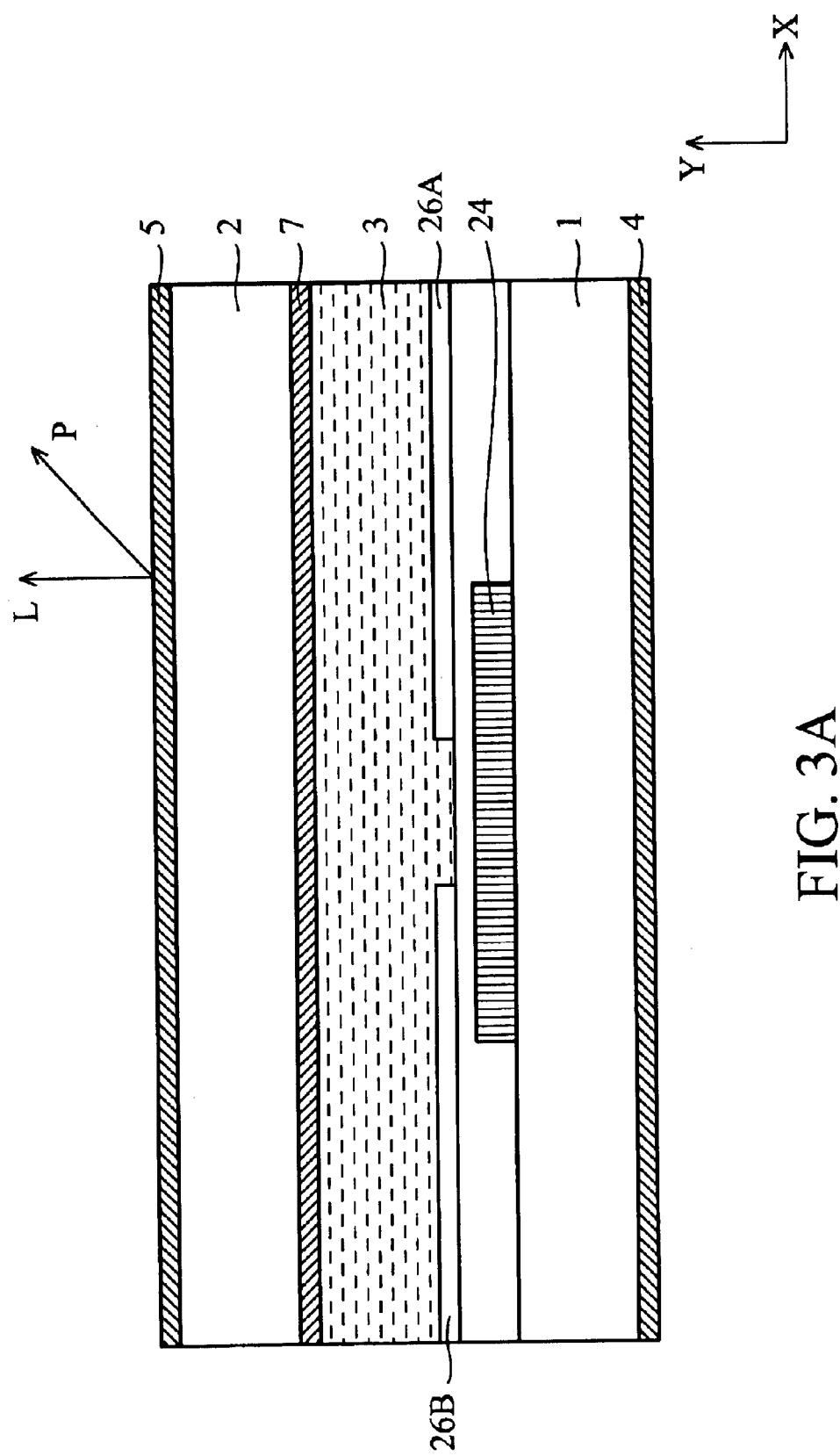
FIG. 3A is a sectional diagram of an electrode structure in a pixel of a TFT-LCD device according to the first embodiment of the present invention.
Figure 3B:
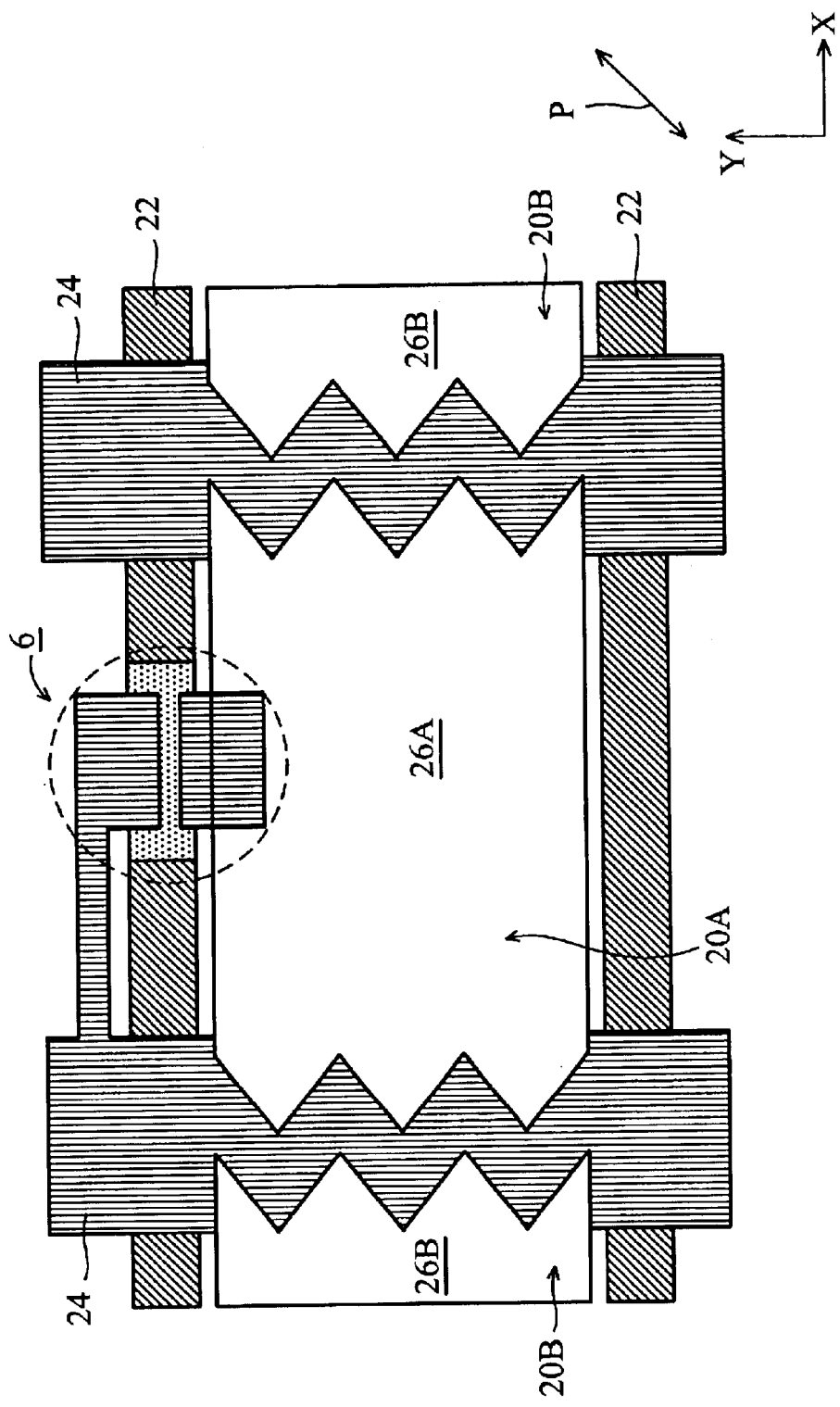
FIGS. 3B and 3C are top views of an electrode structure in a pixel of a TFT-LCD device according to the first embodiment of the present invention.
Figure 3C:
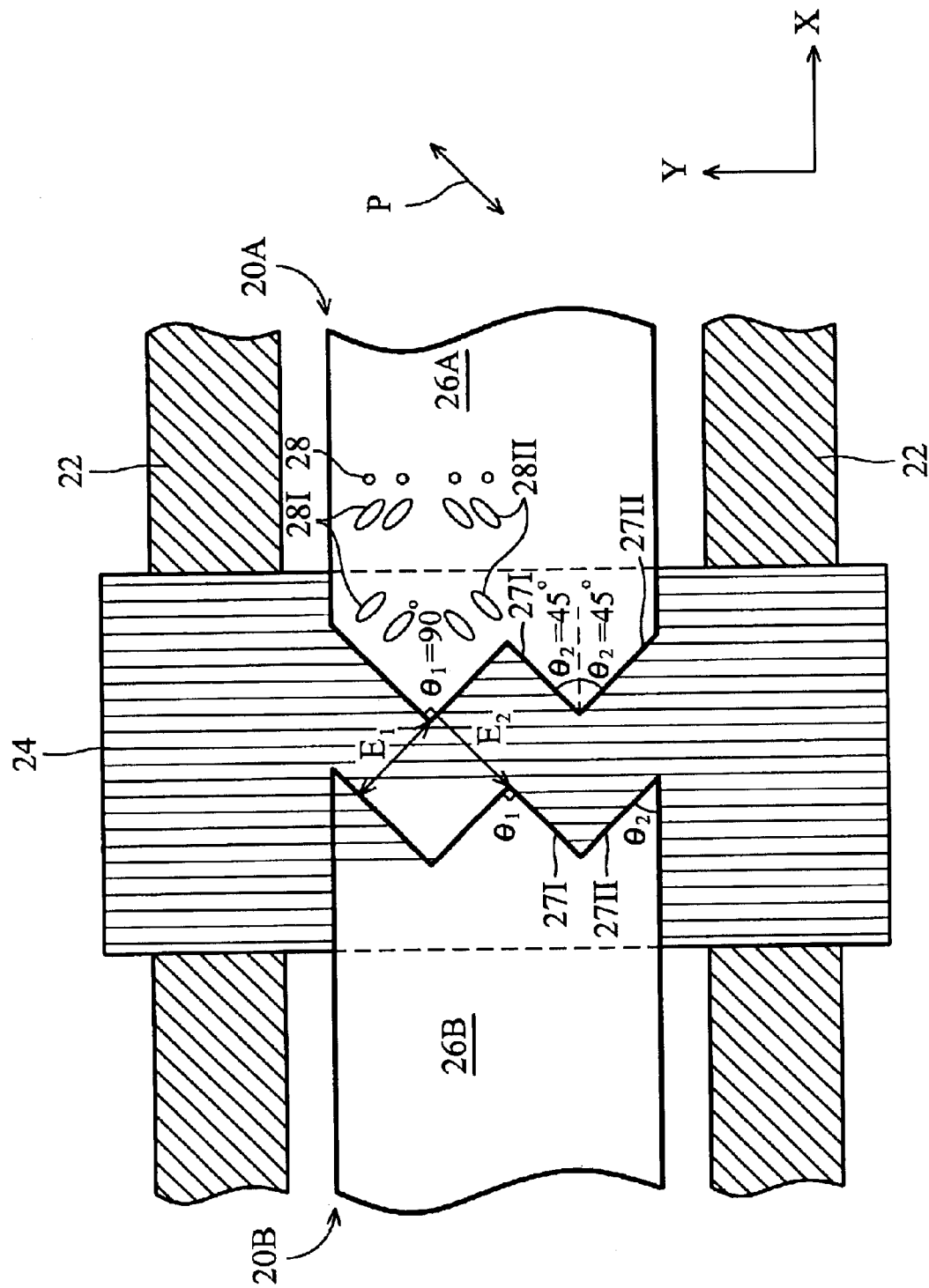

A first embodiment of the present invention is now described with reference to FIGS. 3A through 3C. FIG. 3A is a sectional diagram of an electrode structure in a pixel of a TFT-LCD device according to the first embodiment of the present invention. FIGS. 3B and 3C are top views of an electrode structure in a pixel of a TFT-LCD device according to the first embodiment of the present invention.

In FIG. 3A, the TFT-LCD device comprises a lower substrate 1 and an upper substrate 2 parallel to each other, and a liquid crystal layer 3 in the internal space between the lower substrate 1 and the upper substrate 2. A lower polarizer 4 is formed on the exterior surface of the lower substrate 1, an upper polarizer 5 is formed on the exterior surface of the upper substrate 2, and a common electrode 7 is formed on the interior surface of the upper substrate 2. An arrow L indicates a light-incident direction, and an arrow P indicates a light-entry direction (a light-polarization planar direction of the polarizer 4 and 5). The included angle between the arrow P and the X axis is 45°.

In FIGS. 3B and 3C, on the interior surface of the lower substrate 1, a plurality of transverse-extending gate lines 22 and a plurality of lengthwise-extending data lines 24 are patterned to define a plurality of pixels 20 in a matrix. Each of the pixels 20 comprises a pixel electrode 26 and a TFT 6. Using one data line 24 as the boundary, a first pixel area 20A is covered by a first pixel electrode 26A, and a second pixel area 20B is covered by a second pixel electrode 26B. Also, the periphery of the first pixel electrode 26A overlaps one side portion of the data line 24, the periphery of the second pixel electrode 26A overlaps another side portion of the data line 24, and a predetermined distance is kept to space the first pixel electrode 26A from the second pixel electrode 26B over the data line 24.

The first key feature of the first embodiment is that the periphery of the pixel electrode is a triangle-wave profile. Particularly, within one overlapping portion between the first pixel electrode 26A and the data line 24, the periphery of the first pixel electrode 26A is a triangle-wave profile. Similarly, within the other overlapping portion between the second pixel electrode 26B and the data line 24, and the periphery of the second pixel electrode 26B is a triangle-wave profile.

Preferably, in FIG. 3C, the triangle-wave profile is formed by connecting a plurality of right-angled and equilateral triangles. For example, each triangle constitutes a first hypotenuse 27I (upper right toward lower left), a right angle $\theta_1$, and a second hypotenuse 27I (upper left toward lower right). Thus, the angle $\theta_1$ at the protruding portion of the triangle-wave profile is 90°, the included angle $\theta_2$ between the first hypotenuse 27II and the X axis is 45°, and the included angle $\theta_2$ between the second hypotenuse 27II and the X axis is 45°. Also, the first hypotenuse 27I of the first pixel electrode 26A is parallel to the first hypotenuse 27I of the second pixel electrode 26B, and the second hypotenuse 27II of the first pixel electrode 26A is parallel to the second hypotenuse 27II of the second pixel electrode 26B.

The second key feature of the first embodiment is that the overlapping portion between the pixel electrode 26 and the data line 24 is larger than the total area of the triangles. Preferably, the width of the data line 24 is about 10 μm.

In a case using TN-type (twisted nematic type) LCD with a parallel-treatment alignment film, when an extra voltage exceeds a critical value, the liquid crystal molecules 28 originally parallel to the alignment film are rotated to become perpendicular to the alignment layer in accordance with the magnitude of the lengthwise electric field. With regard to the rotating orientation of the liquid crystal molecules 28I and 28II near the overlapping portion between the data line 24 and the periphery of the first pixel electrode 26A, a transverse electric field generated between the periphery of the first pixel electrode 26A and the periphery of the second pixel electrode 26B is influenced by the triangle-wave profile so as to incline. For example, an arrow E indicates a first-inclined electric field generated between the first hypotenuse 27I of the first pixel electrode 26A and the first hypotenuse 27I of the second pixel electrode 26B. An arrow $E_2$ indicates a second-inclined electric field generated between the second hypotenuse 27II of the first pixel electrode 26A and the second hypotenuse 27II of the second pixel electrode 26B. Therefore, the first liquid crystal molecule 28I rotates in the direction of the arrow $E_1$, and the second liquid crystal molecule 28II rotates in the direction of the arrow $E_2$.

Concerning the light-polarization planar direction on the polarizer shown by the arrow P, an included angle between the arrow P and the long-axis direction of the first liquid crystal molecule 28I is 90°, and the long-axis direction of the second liquid crystal molecule 28II is parallel to the arrow P. This avoids birefringence effect, that is, no ellipsoidal polarized light passes an analyzer. Thus, Mura phenomenon does not occur near the boundary of the data line 24, eliminating light leakage.

The rotating orientations of liquid crystal molecules near the overlapping portion between the data line 24 and the periphery of the second pixel electrode 26B are similar to the above-described phenomenon, with no need for further description.

Second Embodiment

Figure 4:
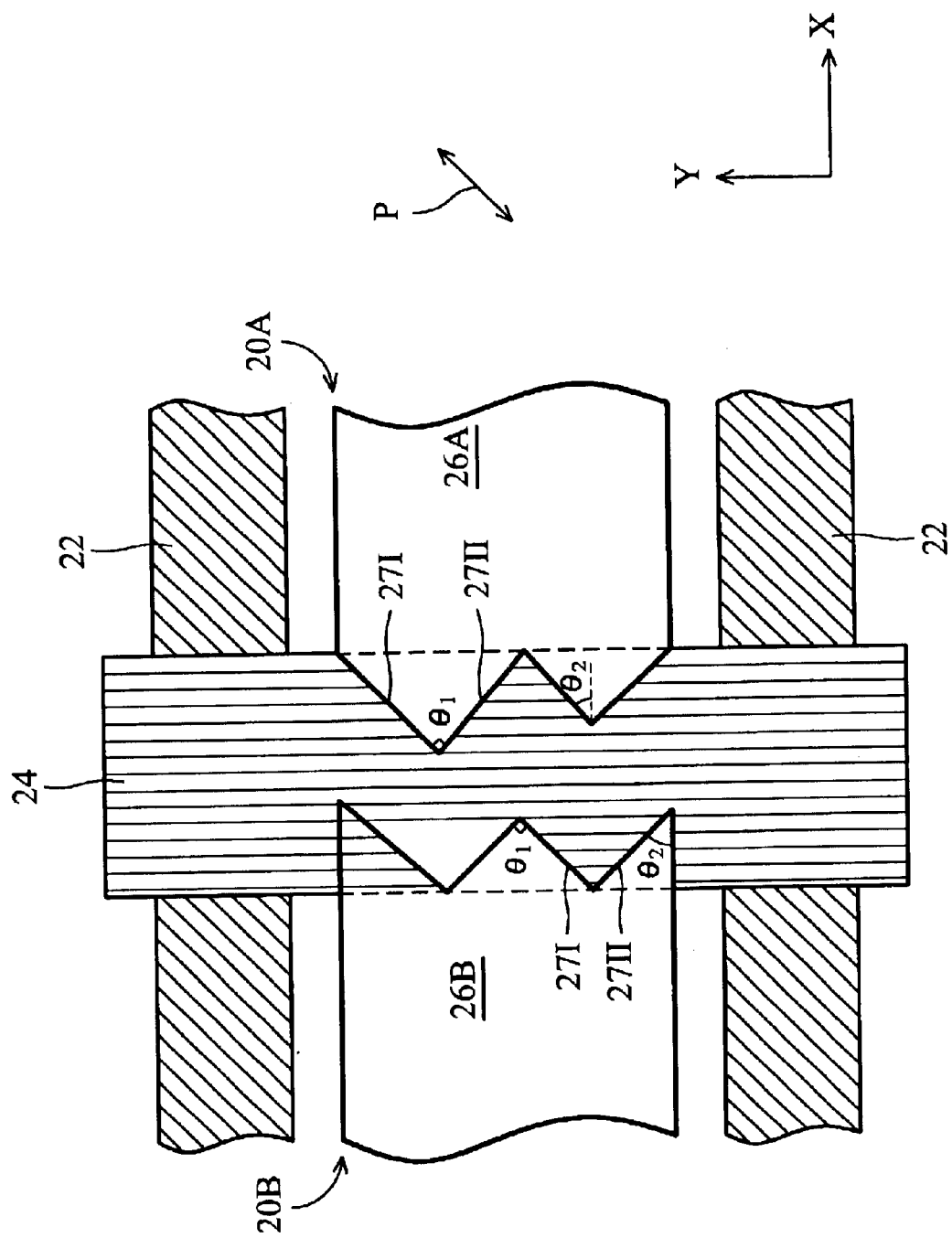
FIG. 4 is a view of an electrode structure in a pixel of a TFT-LCD device according to the second embodiment of the present invention.

FIG. 4 is a view of an electrode structure in a pixel of a TFT-LCD device according to the second embodiment of the present invention. Most of the electrode structure in the second embodiment is similar to the first embodiment, and the identical parts are omitted with no need for further description. The difference is that the width of the data line 24 is reduced to make the area of the overlapping portion equal to the total area of the triangles. This can achieve the same advantages as described in the first embodiment. Also, by reducing the width of the data line 24 to achieve 3~10 μm, the aperture ratio of the TFT-LCD device is further improved.

Third Embodiment

Figure 5:
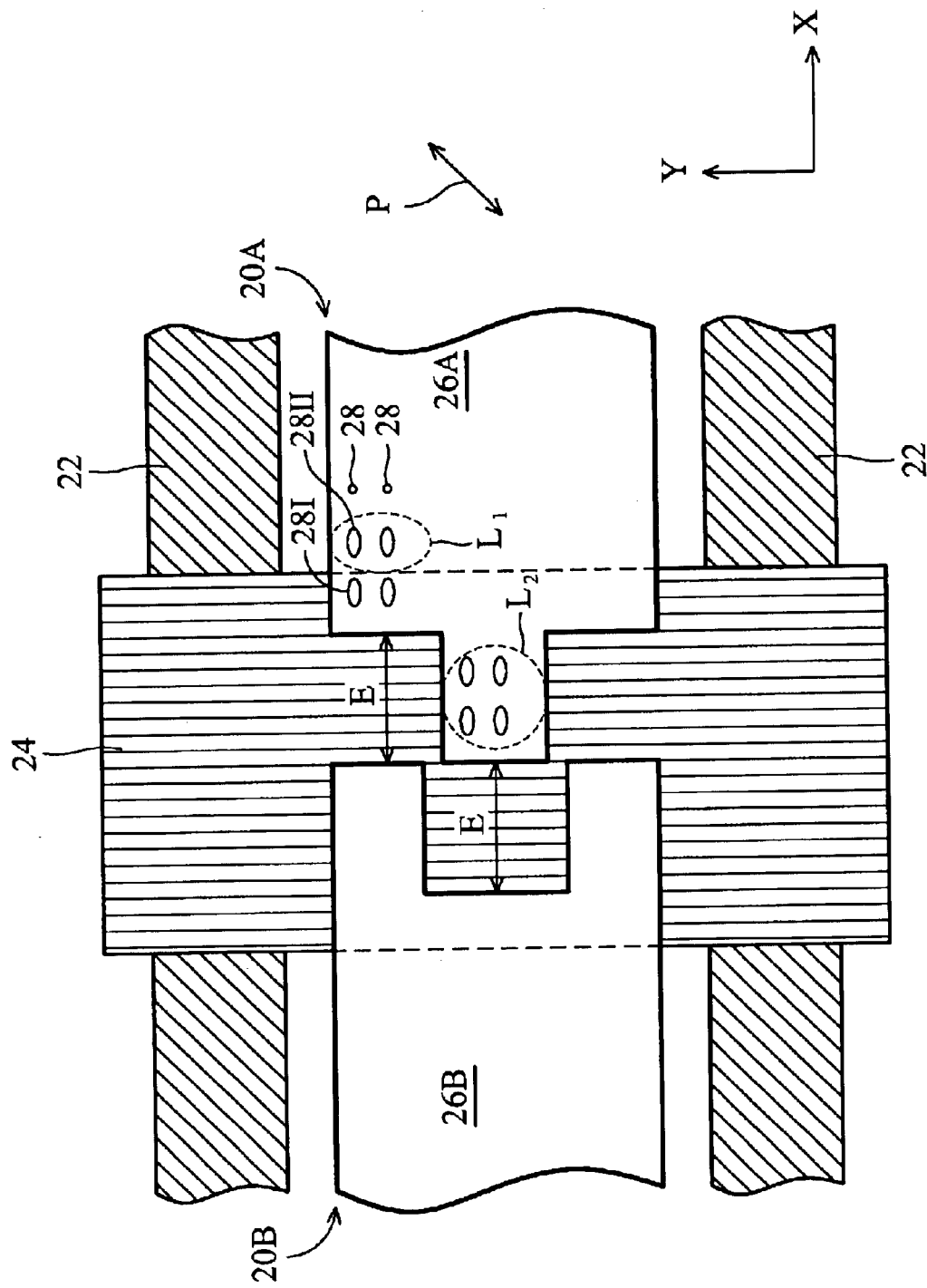
FIG. 5 is a view of an electrode structure in a pixel of a TFT-LCD device according to the third embodiment of the present invention.

FIG. 5 is a view of an electrode structure in a pixel of a TFT-LCD device according to the third embodiment of the present invention. Most of the electrode structure in the third embodiment is similar to the first embodiment, and the identical parts are omitted with no need for further description. The difference is that the periphery of the first pixel electrode 26A is a square-wave profile, and the periphery of the second pixel electrode 26B is a square-wave profile. The square-wave profile is formed by connecting a square protrusion and a square indentation in sequence. Particularly, the square protrusions of the first pixel electrode 26A correspond in position to the square indentations of the second pixel electrode 26B, and the square indentations of the first pixel electrode 26A correspond in position to the square protrusions of the second pixel electrode 26B.

In a case using TN-type (twisted nematic type) LCD with a parallel-treatment alignment film, when an extra voltage exceeds a critical value, the liquid crystal molecules 28 originally parallel to the alignment film are rotated to become perpendicular to the alignment layer in accordance with the magnitude of the lengthwise electric field. With regard to the rotating orientation of the liquid crystal molecules 28I and 28II near the overlapping portion between the data line 24 and the periphery of the first pixel electrode 26A, a transverse electric field, as shown by an arrow E, is generated between the periphery of the first pixel electrode 26A and the periphery of the second pixel electrode 26B. Therefore, the rotating orientations of the liquid crystal molecules 28I and 28II are influenced by the transverse electric field E and the lengthwise electric field.

Concerning a light-polarization planar direction on the polarizer as shown by the arrow P, when an included angle between the arrow P and the long-axis direction of the liquid crystal molecule 28I or 28II is 45°, an ellipsoidal polarized light caused by birefringence effect may pass an analyzer to cause Mura phenomenon, resulting in a first light leakage area $L_1$ near the square indentation and a second leakage area $L_2$ near the square protrusion. However, since the data line 24 shields the second leakage area $L_2$, Mura phenomenon is eliminated.

The rotating orientations of liquid crystal molecules over the overlapping portion between the data line 24 and the periphery of the second pixel electrode 26B is similar to the above-described phenomenon with no need for further description.

Fourth Embodiment

Figure 6:
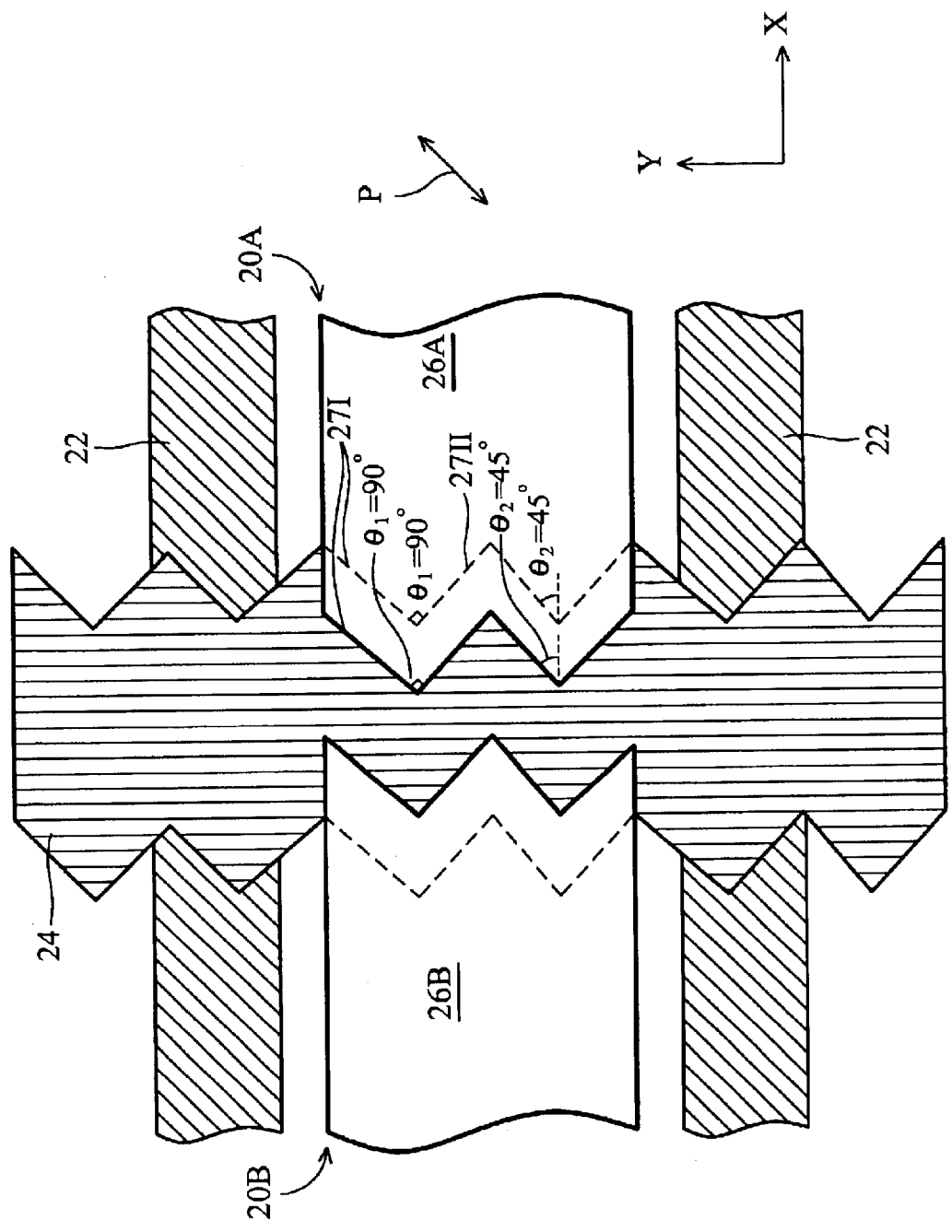
FIG. 6 is a view of an electrode structure in a pixel of a TFT-LCD device according to the fourth embodiment of the present invention.

FIG. 6 is a view of an electrode structure in a pixel of a TFT-LCD device according to the fourth embodiment of the present invention. Most of the electrode structure in the fourth embodiment is similar to the first embodiment, and the identical parts are omitted with no need for further description. The difference is that each sidewall of the data line 24 is a triangle-wave profile; with the features of the triangle-wave profile the same as the first pixel electrode 26A and the second pixel electrode 26B. Preferably, the triangle-wave profile is formed by connecting a plurality of right-angled and equilateral triangles. Each triangle constitutes a first hypotenuse 27I (upper right toward lower left), a right angle, and a second hypotenuse 27II (upper left toward lower right). Thus, the angle $\theta_1$ at the protruding portion of the triangle-wave profile is 90°, the included angle $\theta_2$ between the first hypotenuse 27I and X axis is 45°, and the included angle $\theta_2$ between the second hypotenuse 27II and X axis is 45°.

Also, the first hypotenuse 27I of the data line 24 is parallel to the first hypotenuse 27I of the first pixel electrode 26A and parallel to the first hypotenuse 27I of the second pixel electrode 26B, and the second hypotenuse 27II of the data line 24 is parallel to the second hypotenuse 27II of the first pixel electrode 26A and parallel to the second hypotenuse 27II of the second pixel electrode 26B.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel electrode structure for a liquid crystal display with a high aperture ratio, comprising:

a first substrate and a second substrate disposed parallel to each other, in which an internal space is formed between the interior surface of the first substrate and the interior surface of the second substrate;

a liquid crystal layer formed in the internal space;

at least one polarizer formed on the exterior surface of the first substrate or the exterior surface of the second substrate;

a plurality of parallel gate lines transversely formed on the interior surface of the first substrate;

a plurality of parallel data lines vertically formed on the interior surface of the first substrate; and a plurality of pixels defined by the gate line and the data lines in a matrix, in which each pixel comprises at least one TFT formed on the interior surface of the first substrate and near the intersection of the gate line and the data line, a common electrode formed on the interior surface of the second substrate and covering the pixel, and a pixel electrode formed on the interior surface of the first substrate and covering the pixel;

wherein, two adjacent pixel electrodes are disconnected to each other;

wherein, each pixel electrode comprises a first-lengthwise periphery that overlaps a first-adjacent data line to form a first overlapping portion, and a second-lengthwise periphery that overlaps a second-adjacent data line to form a second overlapping portion;

wherein, the first-lengthwise periphery and the second-lengthwise periphery have an identical triangle-wave profile and are symmetrical to each other; and wherein, the triangle-wave profile is formed by connecting a plurality of right-angled and equilateral triangles.

2. The pixel electrode structure for a liquid crystal display with a high aperture ratio as claimed in claim 1, wherein the area of the first overlapping portion is larger than the total area of the triangles of the first-lengthwise periphery, and the area of the second overlapping portion is larger than the total area of the triangles of the second-lengthwise periphery.

3. The pixel electrode structure for a liquid crystal display with a high aperture ratio as claimed in claim 1, wherein the area of the first overlapping portion is equal to the total area of the triangles of the first-lengthwise periphery, and the area of the second overlapping portion is equal to the total area of the triangles of the second-lengthwise periphery.

4. The pixel electrode structure for a liquid crystal display with a high aperture ratio as claimed in claim 1, wherein the width of the data line is 3~10 µm.

5. The pixel electrode structure for a liquid crystal display with a high aperture ratio as claimed in claim 1, wherein the liquid crystal device is a TN-type (twisted nematic) LCD.

6. The pixel electrode structure for a liquid crystal display with a high aperture ratio as claimed in claim 1, wherein an included angle between a light-polarization planar direction of the polarizer and an X axis is 45°.

7. The pixel electrode structure for a liquid crystal display with a high aperture ratio as claimed in claim 1, wherein one sidewall of the data line is a triangle-wave profile identical and symmetrical to the triangle-wave profile of the first-lengthwise periphery, and the other sidewall of the data line is a triangle-wave profile identical and symmetrical to the triangle-wave profile of the second-lengthwise periphery.

8. The pixel electrode structure for a liquid crystal display with a high aperture ratio as claimed in claim 1, wherein each sidewall of the data line is a triangle-wave profile, and the triangle-wave profile comprises a plurality of right-angled and equilateral triangles connected to each other.

* * * * *